United States Patent [19]
Takeshita et al.

[11] Patent Number: 5,909,328
[45] Date of Patent: Jun. 1, 1999

[54] MAGNETIC RECORDING DEVICE AND CAMERA WITH MAGNETIC RECORDING DEVICE

[75] Inventors: Yukitaka Takeshita, Asaka; Yasuhiko Tanaka, Omiya, both of Japan

[73] Assignees: Fuji Photo Film Co., Ltd., Kanagawa; Fuji Photo Optical Co., Ltd., Saitama, both of Japan

[21] Appl. No.: 08/808,660

[22] Filed: Feb. 28, 1997

[30] Foreign Application Priority Data

Feb. 29, 1996 [JP] Japan ................................ 8-043037

[51] Int. Cl.⁶ ........................ G11B 5/633; G03B 17/24
[52] U.S. Cl. ................................ 360/3; 396/319
[58] Field of Search .................. 396/319, 320; 354/106, 21, 75, 76, 105; 352/27, 174, 178, 179, 72; 360/3, 1, 75, 104, 105, 109, 128, 130.3, 130.31, 130.32

[56] References Cited

U.S. PATENT DOCUMENTS

| | | | |
|---|---|---|---|
| 4,089,596 | 5/1978 | Krumbein | 352/27 |
| 5,508,768 | 4/1996 | Wakabayashi et al. | 354/106 |
| 5,543,871 | 8/1996 | Shimizu | 354/106 |
| 5,572,268 | 11/1996 | Tamamura | 396/319 |
| 5,737,653 | 4/1998 | Tokui | 396/319 |
| 5,742,858 | 4/1998 | Aoshima | 396/320 |
| 5,761,555 | 6/1998 | Ishihara et al. | 396/319 |

FOREIGN PATENT DOCUMENTS

| | | | |
|---|---|---|---|
| 3-200131 | 9/1991 | Japan | G03B 17/24 |
| 4-1622 | 1/1992 | Japan | G03B 17/00 |
| 4-178638 | 6/1992 | Japan | G03B 17/24 |

*Primary Examiner*—Paul W. Huber
*Attorney, Agent, or Firm*—Sughrue, Mion, Zinn, Macpeak & Seas, PLLC

[57] ABSTRACT

A film pressure plate is provided with a magnetic head which records magnetic information in a magnetic recording section at lower edge of photographic film. A saddle-shaped pad is arranged at the front of a rail plate in such a manner as to face the magnetic head. There is provided a leaf spring for pushing the pad from an opening formed in the rail plate in a direction for the pad to advance onto a film feed path such that a longitudinal direction of the leaf spring corresponds to the film feed direction. A fixed end of the leaf spring is fixed at the upstream of a direction in which the film is fed when the magnetic data are recorded. Thereby, the pad can stably contact with the face of the film while the film is being fed, and the magnetic recording section on the film can come into contact with the magnetic head in a stable manner.

13 Claims, 9 Drawing Sheets

MAGNETIC RECORDING DEVICE AND CAMERA WITH MAGNETIC RECORDING DEVICE

BACKGROUND OF THE INVENTION

1. Field of the Invention

The present invention relates generally to a magnetic recording device and a camera with the magnetic recording device, and more particularly to a magnetic recording device which magnetically records data, such as photographing information, on a magnetic recording layer coated on the whole surface or one part of the surface of photographic film, and a camera with the magnetic recording device.

2. Description of the Related Art

A camera is proposed which uses photographic film coated with a magnetic recording layer, and writes data such as date and time of photographing and photographic information by means of a magnetic head or reads out the information from the magnetic recording layer while the photographic film is fed during photographing (Japanese Patent Publication Nos. 3-200131, 4-1622, 4-178648, etc.)

Such a camera is usually constructed in such a manner that the magnetic head is fixed to a film pressure plate or a back lid of the camera, and a pad is arranged to place the magnetic head across the film so that the film can come into contact with the magnetic head. The pad is pushed toward the face of the film to press a magnetic recording area (a magnetic recording section) on the film against the magnetic head.

The pad is usually provided at the side of a film feed path because the magnetic recording layer is formed at the edge of the film, and the like. The pad is guided toward the magnetic head, and it is pushed toward the magnetic head by a coil spring, etc.

However, in view of the limited space in the camera, it is difficult to secure a space for the coil spring. Moreover, as the film is transported, the pad on the face of the film inclines in a film transport direction, and the pad cannot steadily press the film.

If the pad is displaced or the force for pressing the film becomes unbalanced as stated above, the magnetic head cannot correctly read or write the magnetic information.

SUMMARY OF THE INVENTION

The present invention has been developed in view of the above-described circumstances, and has as its object the provision of a magnetic recording device which is provided with a structure for supporting a pressing means to apply uniform force to a face of a film, and which can correctly record magnetic information, and a camera with the magnetic recording device.

In order to achieve the above-mentioned object, the present invention comprises: a magnetic head coming into contact with the magnetic recording layer to record data while the film winding device feeds the photographic film; a pressing means arranged to face the magnetic head to bring the magnetic recording layer on the photographic film into contact with the magnetic head; and a plate-shaped elastic member for supporting the pressing means and pushing the pressing means toward the magnetic head, the plate-shaped elastic member in which a longitudinal direction thereof corresponds to the film feed direction along a longitudinal direction of a member for determining the exposure opening at the front of the photographic film and a fixed end is fixed at the upstream of the film feed direction when the data are recorded.

According to the present invention, the plate-shaped elastic member for pushing the pressing means is arranged such that a longitudinal direction of the plate-shaped elastic member can correspond to a film feed direction. A fixed end of the plate-shaped elastic member is fixed at the upstream of the film feed direction when the data are recorded. Thereby, the pressing means is not inclined in the film feed direction while the film is fed. Thus, the pressing means comes into contact with the film face while the film is fed, and the film is in contact with the magnetic head in a stable manner.

It is easy to secure a long space in the film feed direction, and if the film feed direction corresponds to the longitudinal direction of the plate-shaped elastic member, the plate-shaped elastic member can have a long reach. If the plate-shaped elastic member has a long reach, the pressing means can easily become vertical, and the force from the pressing means can be equalized. Thus, the magnetic information can be accurately recorded with no error.

Moreover, the plate-shaped elastic member is arranged such that the face of the plate-shaped elastic member can be substantially parallel to the film face. Thereby, the pressing means can come into contact with the film face, and the force from the pressing means can be equalized in the film feed direction.

In order to archive the above-mentioned object, another invention comprises: a cartridge chamber wherein a film cartridge including photographic film wound around a spool, the photographic film being coated with a magnetic recording layer; a windup chamber provided with a windup axis for winding up the photographic film pulled out from the film cartridge mounted in the cartridge chamber; a photographic film path having a film exposure opening between the cartridge chamber and the windup chamber and keeping flat the photographic film pulled out from the film cartridge; a guide rail provided along the photographic film path and regulating a position of the photographic film transported on the photographic film path; a film winding device for winding the photographic film by one frame into the windup chamber after photographing; a magnetic head coming into contact with the magnetic recording layer to record data while the film winding device feeds the photographic film; a pressing means arranged to face the magnetic head to bring the magnetic recording layer on the photographic film into contact with the magnetic head; and a plate-shaped elastic member for supporting the pressing means and pushing the pressing means toward the magnetic head, the plate-shaped elastic member in which a longitudinal direction thereof corresponds to the film feed direction along a longitudinal direction of a member for determining the exposure opening at the front of the photographic film and a fixed end is fixed at the upstream of the film feed direction when the data are recorded.

According to the present invention, the film is pulled out from the film cartridge mounted in the cartridge chamber, and the film is kept flat on the film path and is fed along the guide rail to be wound up by the windup axis in the windup chamber. During the feeding, the magnetic head abuts on the magnetic recording layer on the film, so that the data can be recorded in the magnetic recording layer.

Furthermore, the present invention can be applied to a so-called pre-winding camera in which the unexposed film is wound from the film cartridge to the windup spool before photographing, and then the photographing is performed while the film is being rewound into the film cartridge on a frame-by-frame basis.

In the above-mentioned camera, the magnetic data are recorded when the film is transported (rewound) in such a direction as to be housed in the film cartridge. In this case, the fixed end of the plate-shaped elastic member may be provided close to the windup spool at the upstream of the film feed direction when the data are recorded.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
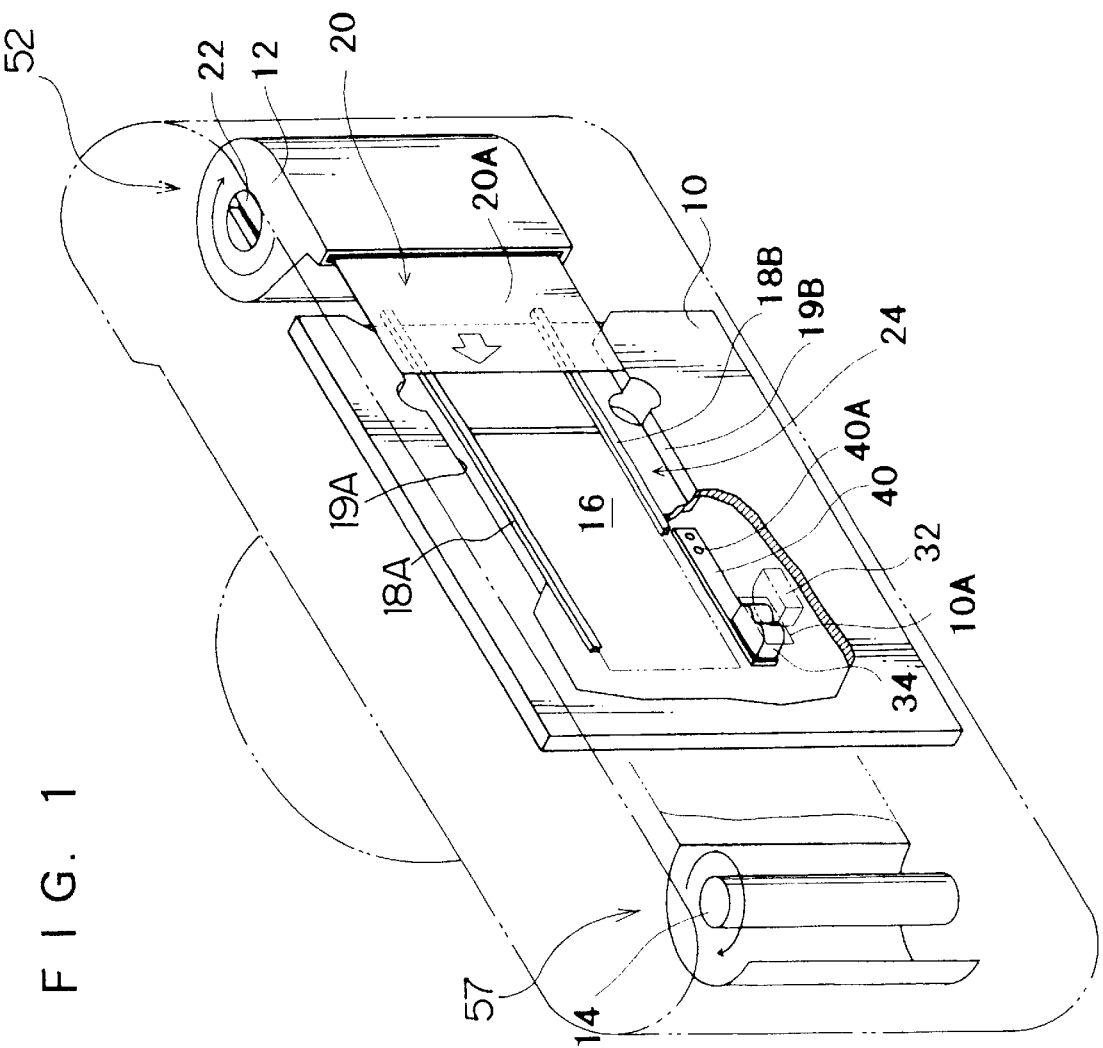
FIG. 1 is a perspective view illustrating the rear of a camera with a magnetic recording device according to the present invention.

FIG. 1 is a perspective view illustrating the rear of a camera with a magnetic recording device. As depicted in FIG. 1, a substantially-square rail plate 10 is provided at the rear of the camera. A film cartridge 12 is mounted at the right of the rail plate 10, and a film windup spool 14 is arranged at the left of the rail plate 10.

A rectangular opening (an exposure frame) 16 is formed at the center of the rail plate 10, and inner rails 18A and 18B are formed along a top side and a bottom side of the exposure frame 16. Outer rails 19A and 19B are formed at the outside of the inner rails 18A and 18B. A film feed path 24 for transporting photographic film 20 is formed by the inner rails 18A and 18B, the outer rails 19A and 19B, and a film pressure plate 58 (See FIG. 8) which will be described later. The photographic film 20 is wound around a spool 22 of the film cartridge 12 in advance. The photographic film 20 is pulled out from the film cartridge 12 by a film driving mechanism (not shown in FIG. 1) which is provided in the camera. The photographic film 20 is fed on the film feed path 24, which is formed by the inner rails 18A and 18B and the outer rails 19A and 19B in a direction indicated by an arrow of FIG. 1, and the photographic film 20 is exposed through the exposure frame 16 formed at the rail plate 10.

The film driving mechanism is composed mainly of a film supplying section for rotating the spool 22 of the film cartridge 12 forward and backward, and a film windup section for driving a film windup spool (a windup axis) 14 to wind up the photographic film 20 pulled out from the film supplying section.

The film supplying section is coupled to the spool 22 of the film cartridge 12, and drives the spool 22 in a direction indicated by an arrow of FIG. 1. The film supplying section sends out the photographic film 20 from the film cartridge 12 until the film windup spool 14 winds up a leader section 20A of the photographic film 20.

On the other hand, the film windup section is coupled to the film windup spool 14, and drives the film windup spool 14 in the direction indicated by the arrow of FIG. 1. The film windup section winds up the photographic film 20, which is pulled out from the film cartridge 12, on a frame-by-frame basis.

Figure 2:
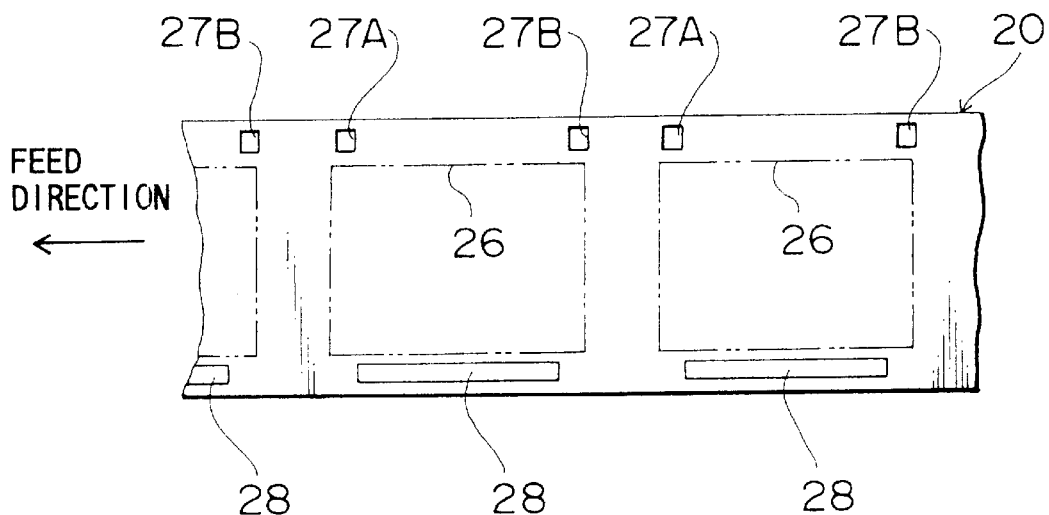
FIG. 2 is a plan view of photographic film used in the camera in FIG. 1.

Pairs of perforations 27A and 27B are punched at regular intervals at the upper edge of the photographic film 20 in the camera (see FIG. 2). The perforations 27A and 27B specify photographing areas 26. A transparent magnetic recording layer is formed on the whole surface of the photographic film 20. The lower edge of the photographic film is used for recording the magnetic information. Information such as photographing conditions and print aspect ratio for each photographing area 26 can be recorded as magnetic information (data) in a magnetic recording area 28 at the lower edge of the photographic film 20.

As depicted in FIG. 1, the camera is provided with a magnetic head 32 (indicated by long and two short alternate lines in FIG. 1) is provided as a means for recording the magnetic information in the magnetic recording section 28 on the photographic film 20. A saddle-shaped pad 34 is provided in such a manner as to face the magnetic head 32. The magnetic head 32 is secured to the film pressure plate 58 (not shown in FIG. 1) such that it is positioned at the outside of the lower left corner of the exposure frame 16 and below the inner rail 18B. The magnetic head abuts on the magnetic recording section 28 at the lower edge of the photographic film 20 which is kept flat on the film feed path 24.

On the other hand, the pad 34 is secured to the tip of a leaf spring 40, and it is arranged at such a position as to abut on the magnetic recording section 28 at the lower edge of the photographic film 20 which is supported by the film feed path 24. The pad 34 is pushed in a direction to advance onto the film feed path 24 from the opening 10A formed at the rail plate 10; that is, a direction to abut on the magnetic recording layer 28.

A leaf spring 40 supporting the pad 34 is constructed in such a manner that a right end (a fixed end) 40A thereof is secured to the front of the rail plate, and one side of the leaf spring 40 is supported by the rail plate 10. Accordingly, the magnetic recording section 28 on the photographic film 20 is pressed against the magnetic head 32 by the pad 34 which has advanced onto the film feed path 24. The magnetic head 32, the pad 34 and the leaf spring 40 will be described later in detail.

Figure 3:
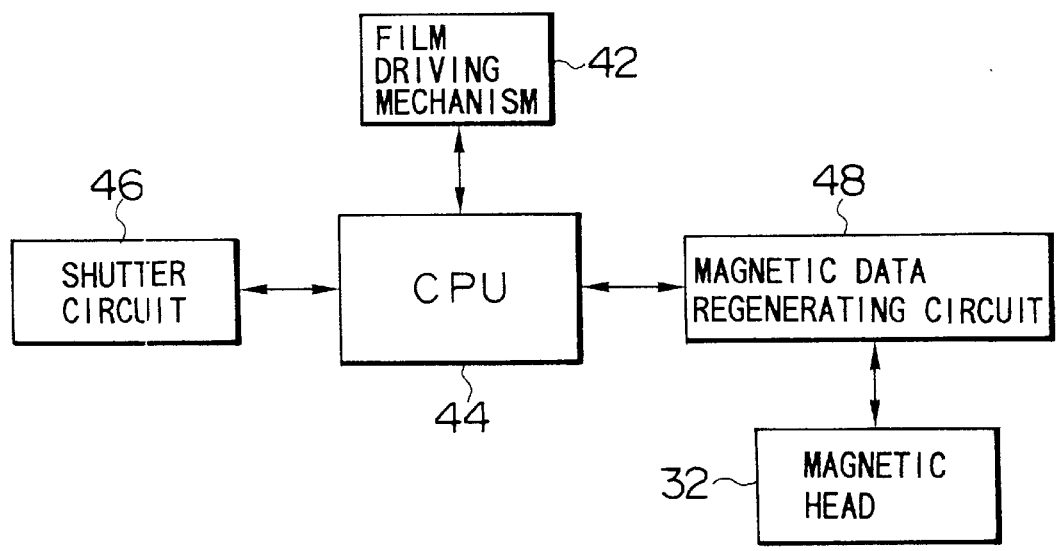
FIG. 3 is a block diagram illustrating a control system of the camera.

FIG. 3 is a block diagram illustrating the control system of the camera. As depicted in FIG. 3, a central processing unit (CPU) 44 of the camera controls a film driving mechanism 42, which winds the photographic film on a frame-by-frame basis every time a shutter circuit outputs a shutter release signal. The CPU 44 also drives the magnetic head 32 via a magnetic data regenerating circuit 48.

Figure 4:
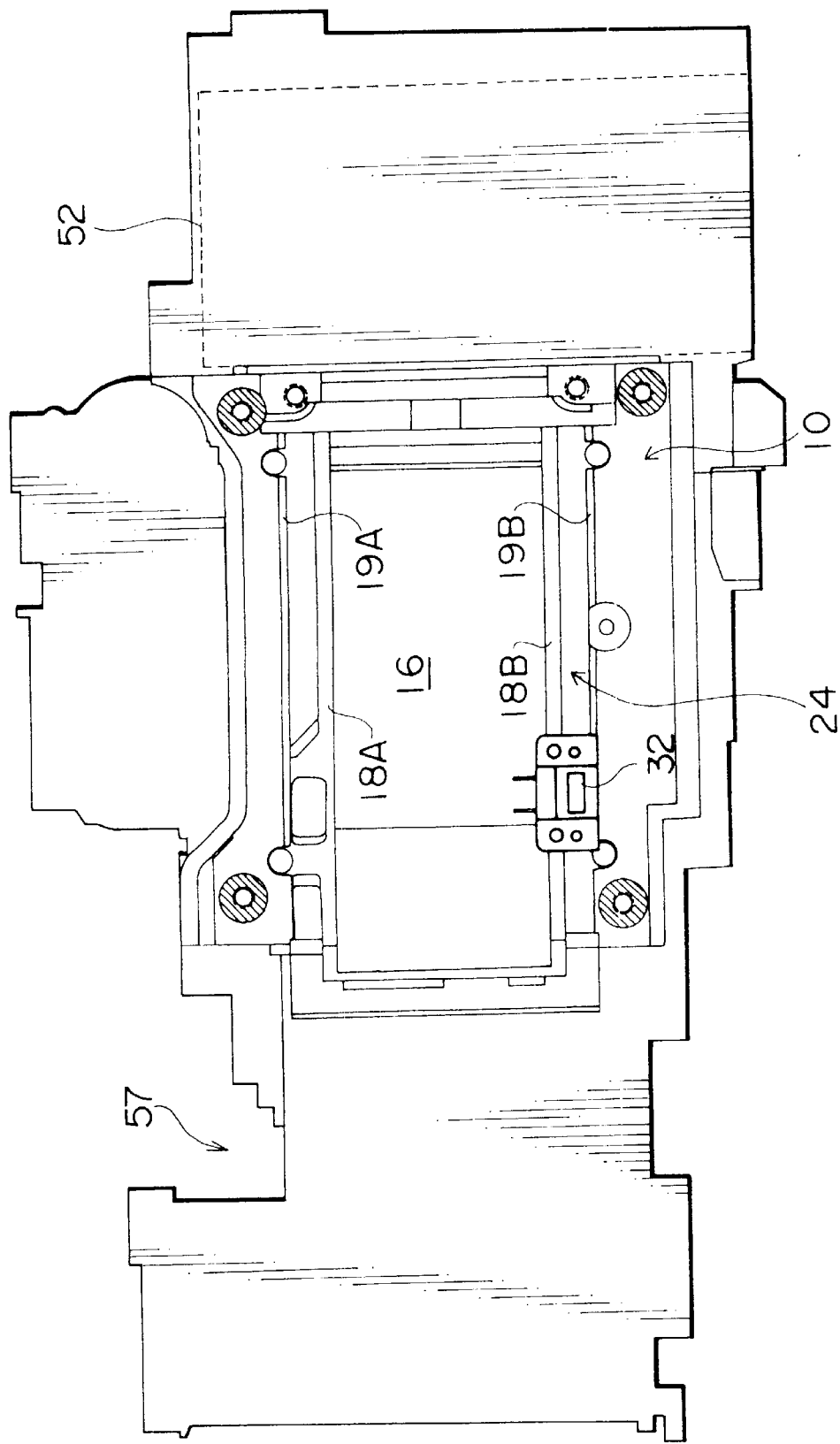
FIG. 4 is a rear view of a camera body.

FIG. 4 is a back view illustrating a camera body including the rail plate 10. If compared with FIG. 1, the rail plate 10 with a rectangular opening (exposure frame 16) is provided at the center of the camera body, and a film cartridge chamber 52 (indicated by a broken line in FIG. 4) is provided at the right side of the drawing across the exposure frame 16. A film windup chamber 57 is provided at the left of the exposure frame 16. The film cartridge 12 is mounted in the cartridge chamber 52 in an axial direction of the spool 22.

The magnetic head 32 is secured to the film pressure plate 58 (see FIGS. 7 and 8), which specifies the back face of the film, behind the rail plate 10. The head face of the magnetic head 32 is arranged at the outside of the lower left of the opening of the exposure frame 16 so that the head face can abut on the magnetic recording layer 28 on the photographic film transported along the film feed path 24.

Figure 5:
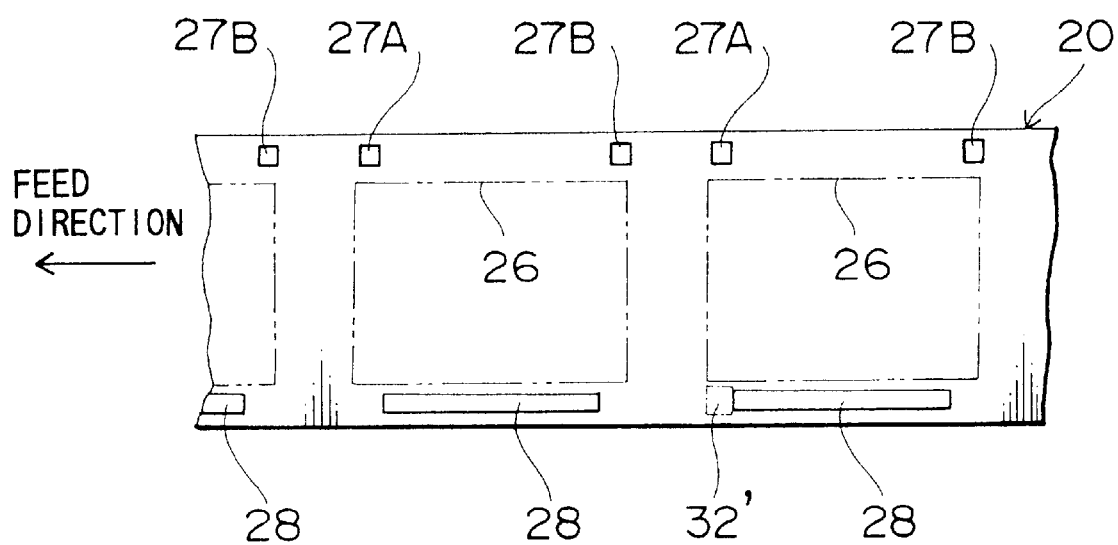
FIG. 5 is a view showing a positional relationship between a magnetic head and photographic film.

FIG. 5 depicts a positional relationship between the magnetic head and the film in the case that the photographic film has been wound by one frame. The magnetic head 32 is arranged at a position where the recording of the magnetic information starts in the magnetic recording section 28 corresponding to the photographing frame; that is, a position 32' indicated by long and short alternate lines in FIG. 5, in the case that the film has been wound by one frame.

Figure 6:
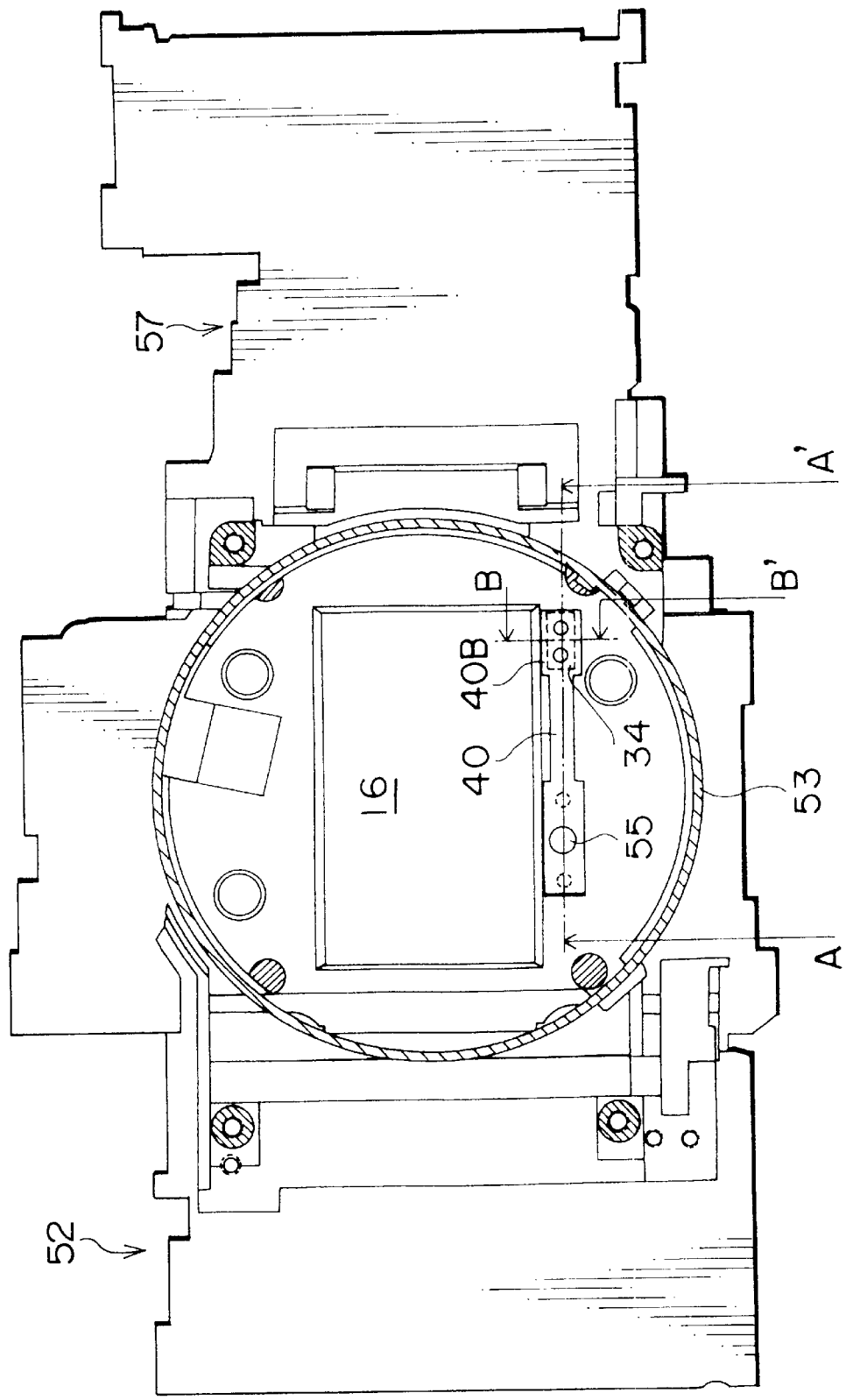
FIG. 6 is a front view of the camera body.

FIG. 6 is a front view of the camera body in FIG. 4. The exposure frame 16 for specifying the opening at the front of the film is provided at the center of the front of the camera body. A fixed cylinder 53 is provided so as to enclose the opening. A lens barrel (not shown) holding the taking lens is arranged at the inside of the fixed cylinder 53.

A face enclosed by the fixed cylinder 53 at the front of the camera body; that is, the front of the rail plate 10, wherein the exposure frame 16 for specifying the exposure opening at the front of the film is formed, is substantially flat. A step is formed below the bottom side of the exposure frame in a proximity of a center line of the exposure frame 16. That is, a part which the fixed end 40A of the leaf spring is fixed to is highest whereas a part on the right side of the center line of the exposure frame 16 is low.

The leaf spring 40 for supporting the pad 34 is fixed to the front of the rail plate 10 along the bottom side of the exposure frame 16. In order to prevent the leaf spring 40 from interfering with the opening area of the exposure frame 16, the longitudinal direction of the leaf spring 40 corresponds to the film feed direction, and the fixed end 40A is arranged at the upstream (on the left side in FIG. 6) of the film feed direction. The fixed end 40A is fixed to the front of the rail plate 10 by a screw 55 at a position slightly to the left from the center line of the exposure frame 16 in FIG. 6. A gap 54 is formed between the tip of the leaf spring 40 and the rail plate by the above-mentioned step (see FIG. 7), and the leaf spring 40 generates the force for pushing the pad 34 toward the magnetic head 32.

A position where the fixed end 40A of the leaf spring 40 is fixed by the screw 55 may be changed within a range where the leaf spring 40 does not interfere with the fixed cylinder 53.

The pad 34 is secured to a tip 40B of the leaf spring 40, that is, at the downstream of the film feed direction. The leaf spring 40 is fixed to the front of the rail plate 10 via the screw 55, so that the tip of the pad 34 substantially corresponds to a line specifying the right end of the exposure frame 16. The opening 10A (see FIG. 1) is formed at a lower-left corner of the exposure frame 16 of the rail plate 10, that is, at a position of the pad 34. The pad 34 faces the magnetic head 32 in FIG. 4 across the opening 10A.

The pad 34 advances onto the film path 24 via the opening 10A, and it sticks the photographic film 20, which is transported along the film path 24, to the head face of the magnetic head 32 in FIG. 4.

Figure 7:
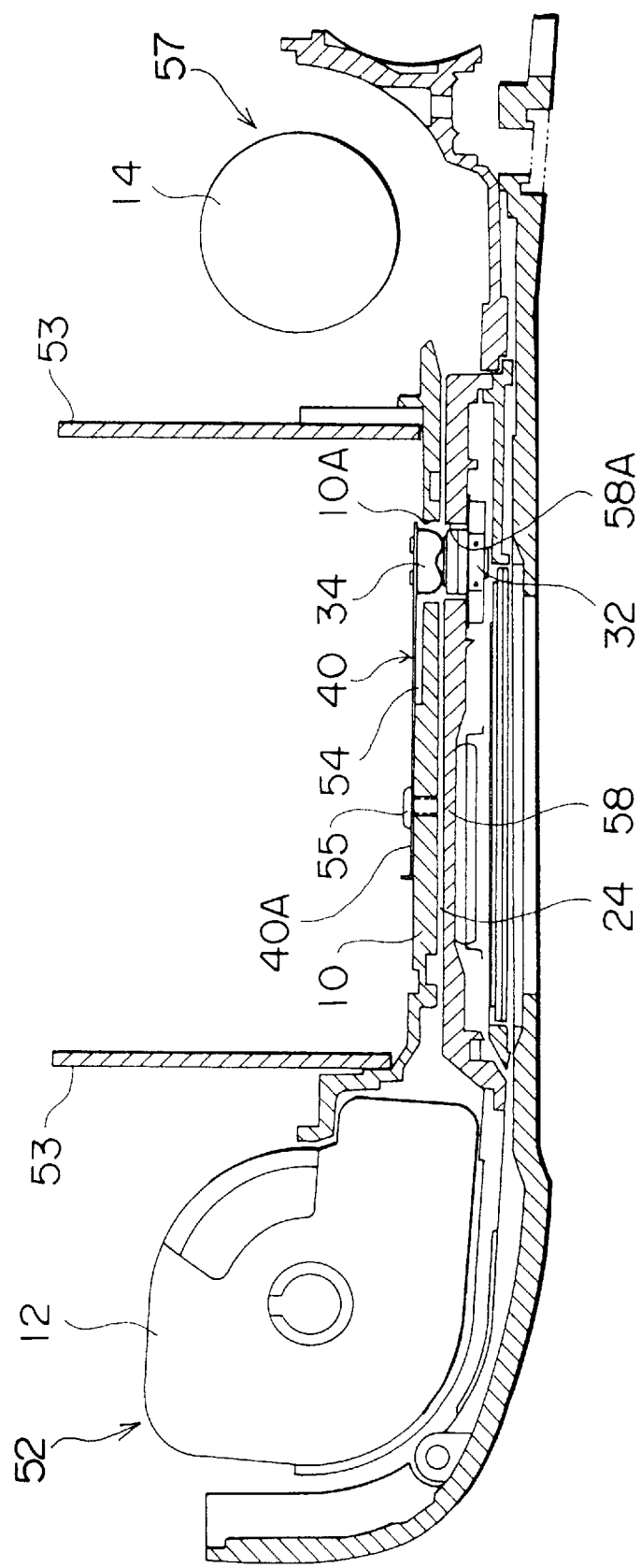
FIG. 7 is a transverse sectional view taken along line A–A' of the camera body in FIG. 6.
Figure 8:
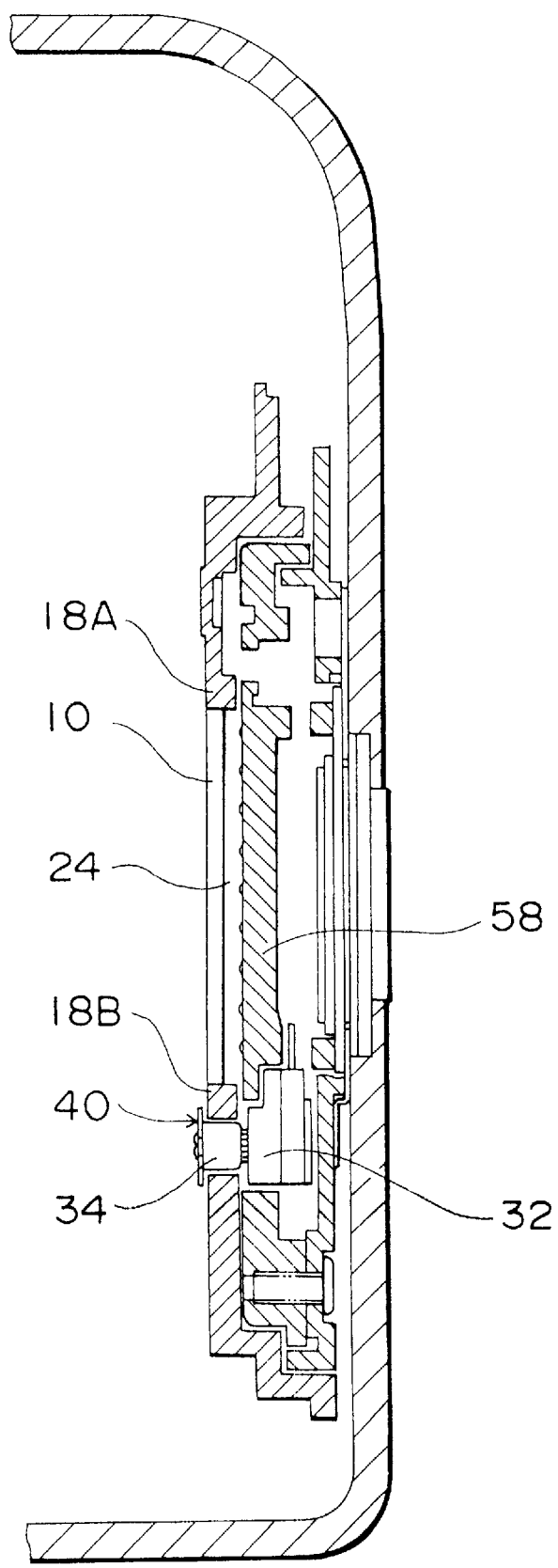
FIG. 8 is a transverse sectional view taken along B–B' of the camera body in FIG. 6.

FIG. 7 is a longitudinal sectional view taking along line A–A' of the camera body in FIG. 6, and FIG. 8 is a transverse sectional view taken along line B–B' of the camera body in FIG. 6. As depicted in FIGS. 7 and 8, the photographic film 20 (not shown in FIGS. 6 and 7) pulled out from the film cartridge 12 passes through the film feed path 24 formed between the film pressure plate 58 and the rail plate 10, and then the photographic film 20 is wound up by the windup spool 14.

The magnetic head 32 is secured directly to the film pressure plate 58. The head face of the magnetic head 32 advances onto the film feed path 24 from the opening 58A formed at the film pressure plate 58, and the head face abuts on the magnetic recording section 28 on the back face of the photographic film 20 (the back side of the emulsion face). On the other hand, the pad 34 is secured to the tip of the leaf spring 40, and it is pushed toward the head face of the magnetic head 32 by the leaf spring 40. A gap 54 is formed below the tip of the leaf spring 40 (the right side in the drawing) because of the step of the rail plate 10. The leaf spring 40 pushes the pad 34 toward the magnetic head 32 due to the gap 54.

In order to form the gap 54, the step is provided at the front of the rail plate 10 as depicted in FIG. 7. A spacer may be used instead of the step, and the fixed end 40A of the leaf spring 40 may be secured to the front of the rail plate to form a required gap.

Thus, the pad 34 presses the photographic film 20 which is transported along the film feed path 24, so that the magnetic recording section 28 on the photographic film 20 can be stuck to the magnetic head 32.

Figure 9:
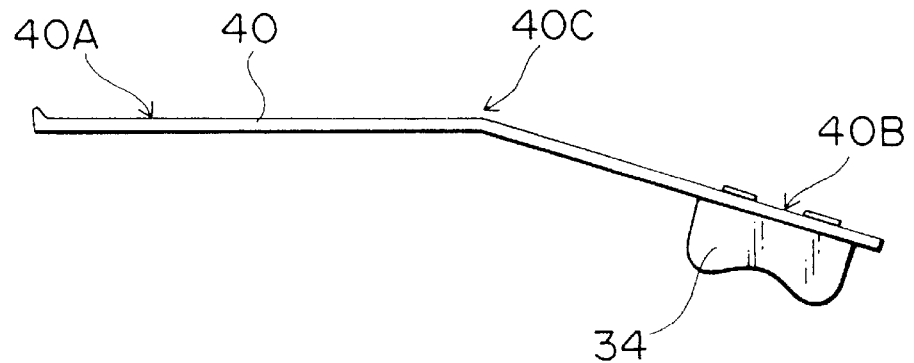
FIG. 9 is a side view illustrating the shape of a leaf spring.

As depicted in FIG. 9, the leaf spring 40 is bent at a proximity to the center 40C thereof before it is attached to the camera. As depicted in FIG. 9, when the leaf spring 40 is attached to the camera, the bend of the leaf spring 40 is flattened so that the leaf spring 40 can become substantially parallel to the film face. Because the face of the leaf spring 40 is substantially parallel to the film face when the leaf spring 40 is attached to the camera, the error in the attachment of the pad 34 can be reduced and the abutting face of the pad 32 can be securely vertical to the face of the film. An explanation will hereunder be given about the operation of the camera with the magnetic recording device, which is constructed in the above-mentioned manner. As depicted in FIGS. 6 and 7, the front face of the rail plate 10 in which the exposure frame 16 for specifying the exposure opening at the front of the film is formed is substantially flat, and the exposure frame 16 is enclosed by the fixed cylinder 53. For this reason, there is a long space below the exposure frame 16 in the longitudinal direction of the exposure frame (that is, the film feed direction).

There is provided in the space the pad 34 for sticking the magnetic recording section 28 on the film to the magnetic head 34, and the leaf spring 40 supporting the pad 34. The leaf spring 40 is fixed such that the longitudinal direction thereof corresponds to the film feed direction, and the fixed end thereof is positioned at the upstream of the film feed direction. The pad 34 is positioned at the downstream of the film feed direction. Thereby, the pad 34 is not swung in the film feed direction while the film is being fed, and the pad 34 can be steadily in contact with the face of the film 20, and the pad 34 can apply a uniform force.

If the fixed end of the leaf spring 40 is provided toward the downstream of the film feed direction when the magnetic information is recorded, and the pad 34 is provided at the upstream of the film feed direction, the film is fed in a direction in which the leaf spring 40 is bent down. Thus, the face of the pad 34 cannot be in contact with the film 20 in a stable manner, and an error easily takes place when the magnetic information is recorded. This has been proved by an experiment using scientific data.

The leaf spring 40 is arranged in the space below the exposure frame 16 enclosed by the fixed cylinder 53 such that the longitudinal direction thereof corresponds to the film feed direction. Thereby, the leaf spring 40 which has a long reach can be used. If the leaf spring 40 of a long reach is used, the face of the pad 34 can be vertical, and the leaf spring 40 can apply the equal force in the forward, backward, upward and downward directions of the photographic film 20.

Moreover, as depicted in FIG. 7, the face of the leaf spring 40 is substantially equal to the film face in such a state that the leaf spring 40 is attached to the camera. The error can be reduced when the pad 34 is attached, and the pad 34 can apply the equal force in the forward, backward, upward and downward directions of the film.

Figure 10:
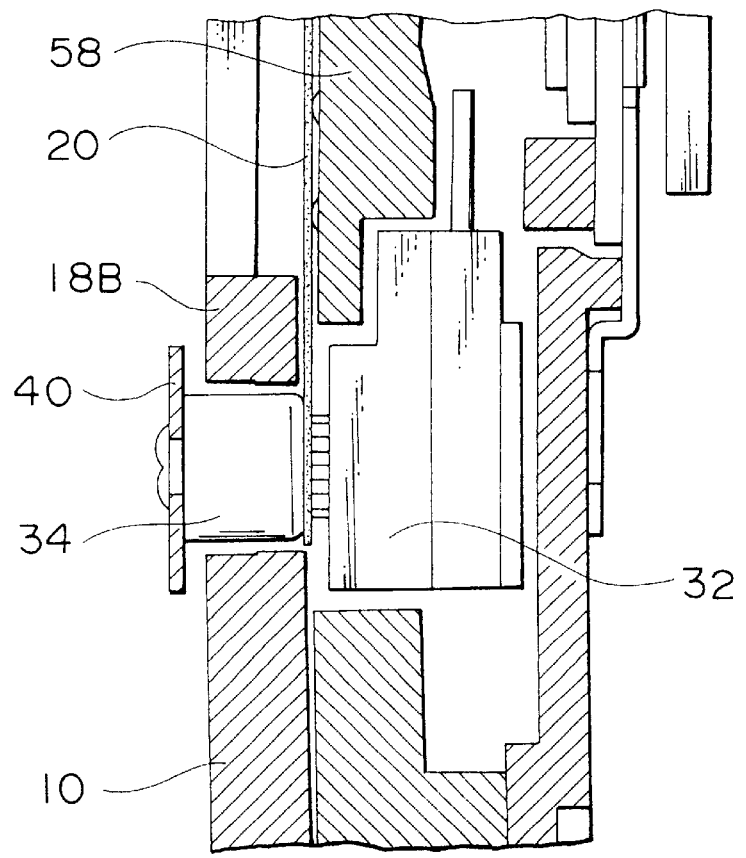
FIG. 10 is a longitudinal sectional view showing the operation of a pad of the camera with the magnetic recording device according to the present invention.
Figure 11:
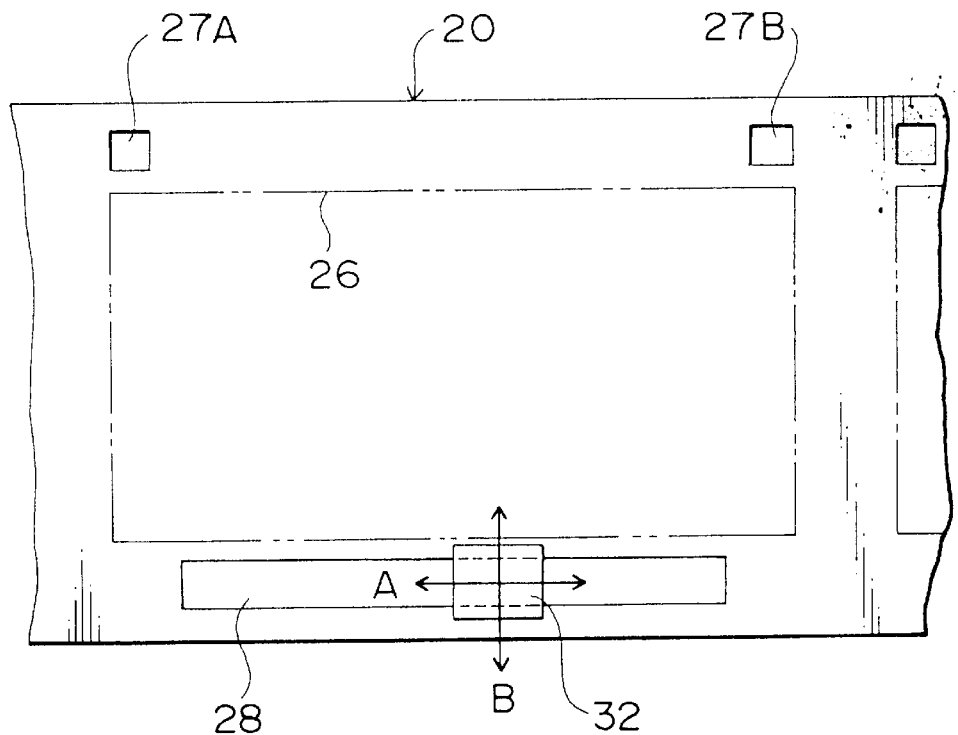
FIG. 11 is a view showing the operation of a pad of the camera with the magnetic recording device according to the present invention.

Thus, as shown in FIG. 10, the magnetic recording section 28 formed at the edge of the photographic film 20 can be stuck to the magnetic head 32. Thereby, as shown in FIG. 11, while the film is fed, the magnetic recording section 28 on the film is pressed against the magnetic head 32 by the force which is applied equally and steadily in the directions A and B (length and breadth) of the film. The error can be reduced when the magnetic information is recorded, and the magnetic information can be correctly recorded.

Moreover, the leaf spring 40 is arranged in the space below the exposure frame 16 enclosed by a fixed cylinder 53 such that the longitudinal direction of the leaf spring 40 corresponds to the film feed direction. For this reason, the mechanism for supporting the pad can be attached without increasing the height and depth of the camera.

In the above-stated embodiment, the explanation was given about the recording of the magnetic information when the film is wound, that is, when the windup spool 14 winds up the photographic film 20 pulled out from the film cartridge 12. However, the embodiment can be applied to a camera which winds unexposed film around the windup spool from a film cartridge, and performs the photographing while rewinding the film into the film cartridge on a frame-by-frame basis. The camera of this type records the magnetic data during rewinding, and in this case, the fixed end of the leaf spring close to the windup spool at the upstream of the film feed direction when the magnetic data is recorded.

In the above-described embodiment, the explanation was given about the case when the magnetic information is recorded. This embodiment may be applied to the case when the magnetic head 32 reads out the magnetic information recorded in the magnetic recording section 28.

Figure 12:
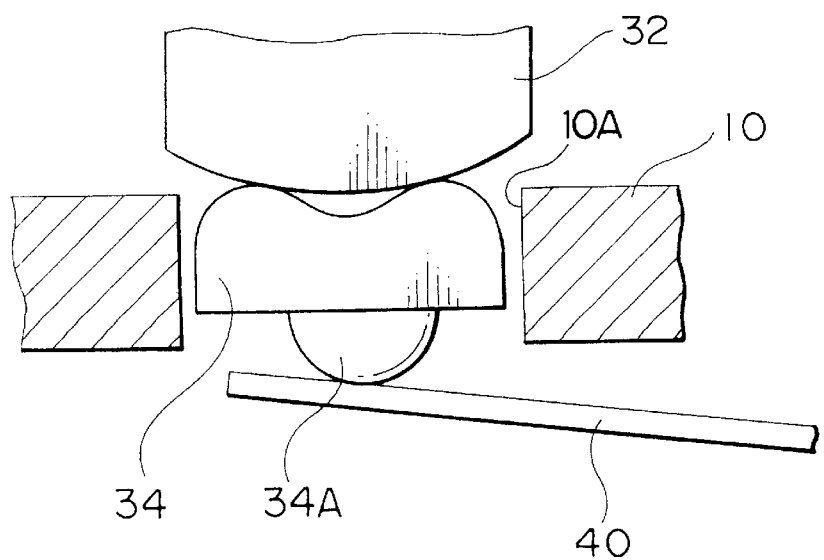
FIG. 12 is an enlarged view showing another embodiment for the present invention.

Moreover, in the above-described embodiment, the pad 34 is secured to the tip of the leaf spring 40. The present invention, however, is not to limited to this. The pad 34 is not necessarily secured to the leaf spring 40 if the top of the pad 34 is uniformly pushed toward the magnetic head 32. For example, as depicted in FIG. 12, the back face of the pad 34 may be a substantial hemisphere 34A, which is supported by the tip of the leaf spring 40 and is pushed toward the magnetic head 32. However, because the pad 32 may be waved in the film transport direction as the film is transported, the pad 34 is desirably secured to the leaf spring 40 as shown in FIG. 7.

Furthermore, in the above-described embodiment, the magnetic head 32 and the pad 34 are fixed at predetermined positions with regard to the film feed path. However, at least one of the magnetic head 32 and the pad 34 may be provided in such a manner to move into or go out of the film feed path, and the magnetic head 32 or the pad 34 may advance onto the film feed path only when the magnetic information is recorded.

In the above-described embodiment, the explanation was given about the camera with the magnetic recording device. The magnetic recording device of the present invention, however, may be widely used for a film image reading (regenerating) device, etc. as well as the camera.

As set forth hereinabove, according to the magnetic recording device and the camera with the magnetic recording device of the present invention, the plate-shaped elastic member for pushing the pressing means is arranged such that the longitudinal direction thereof corresponds to the film feed direction. The plate-shaped elastic member is fixed at the upstream of the film feed direction when the magnetic information is recorded. Thereby, the plate-shaped elastic member can have a long reach, and the pressing means can apply the uniform force. Thus, the pressing means can steadily be in contact with the film face while the film is being fed.

The face of the plate-shaped elastic member is substantially equal to the face of the film, so that the pressing means can be precisely attached.

Thereby, the film can be in contact with the magnetic head in a stable manner, and the magnetic information can be recorded with no error.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A magnetic recording device which uses photographic film coated with a magnetic recording layer, said magnetic recording device comprising:

a magnetic head coming into contact with said magnetic recording layer on said film which is being fed, said magnetic head recording data;

means arranged to face said magnetic head and for pressing said magnetic recording layer on said photographic film against said magnetic head; and a plate-shaped elastic member disposed on a rail plate for supporting said pressing means at one end and pushing said pressing means toward said magnetic head through an opening in said rail plate, said plate-shaped elastic member being provided such that a longitudinal direction thereof corresponds to a film feed direction and a fixed end thereof is fixed at upstream of a film feed direction when said data are recorded.

2. The magnetic recording device as defined in claim 1, wherein said plate-shaped elastic member is arranged such that a face of said plate-shaped elastic member is substantially parallel to a face of said photographic film.

3. The magnetic recording device as defined in claim 1, wherein said plate-shaped elastic member is a leaf spring.

4. The magnetic recording device as defined in claim 1, wherein said pressing means is a pad.

5. A camera with a magnetic recording device, comprising:

a cartridge chamber wherein a film cartridge including photographic film wound around a spool is mounted, said photographic film being coated with a magnetic recording layer;

a windup chamber provided with a windup axis for winding up said photographic film pulled out from said film cartridge mounted in said cartridge chamber;

a film path provided with a film exposure opening between said cartridge chamber and said windup chamber, and keeping flat said photographic film pulled out from said film cartridge;

a guide rail provided along said photographic film path for regulating a position of said photographic film transported on said photographic film path;

a film winding device for winding said photographic film by one frame into said windup chamber after photographing;

a magnetic head coming into contact with said magnetic recording layer for recording data while said photographic film is being fed by said film winding device;

means arranging to face said magnetic head for pressing said magnetic recording layer on said photographic film against said magnetic head; and a plate-shaped elastic member disposed on a rail plate for supporting said pressing means at one end and pushing said pressing means through an opening in said rail plate toward said magnetic head, said plate-shaped elastic member being provided such that a longitudinal direction thereof corresponds to a film feed direction, and a fixed end thereof is fixed at upstream of a film feed direction when said data are recorded.

6. The camera with the magnetic recording device as defined in claim 5, wherein said plate-shaped elastic member is a leaf spring.

7. The camera with the magnetic recording device as defined in claim 5, wherein said pressing member is a pad.

8. A camera with a magnetic recording device, comprising:

a cartridge chamber wherein a film cartridge including photographic film wound around a spool is mounted, said photographic film being coated with a magnetic recording layer;

a windup chamber provided with a windup axis for winding up said photographic film pulled out from said film cartridge mounted in said cartridge chamber;

a film path provided with a film exposure opening between said cartridge chamber and said windup chamber, and keeping flat said photographic film pulled out from said film cartridge;

a guide rail provided along said film path for regulating a position of said photographic film transported on said film path;

a film supplying device for winding unexposed film around said windup axis from said film cartridge mounted in said cartridge chamber before photographing, and rewinding said photographic film by one frame into said film cartridge of said cartridge chamber after photographing;

a magnetic head coming into contact with said magnetic recording layer for recording data while said photographic film is being fed by said film winding device;

pressing means arranged to face said magnetic head for bringing said magnetic recording layer on said photographic into contact with said magnetic head; and a plate-shaped elastic member for supporting said pressing means and pushing said pressing means toward said magnetic head, said plate-shaped elastic member being provided such that a longitudinal direction thereof corresponds to a film feed direction, and a fixed end thereof is fixed at upstream of a film feed direction when data are recorded.

9. The camera with the magnetic recording device as defined in claim 8, wherein said plate-shaped elastic member is a leaf spring.

10. The camera with the magnetic recording device as defined in claim 8, wherein said pressing means is a pad.

11. A magnetic recording device which uses photographic film coated with a magnetic recording layer, said magnetic recording device comprising:

a magnetic head coming into contact with said magnetic recording layer on said film which is being fed, said magnetic head recording data;

a pad arranged to face said magnetic head for bringing said magnetic recording layer on photographic film into contact with said magnetic head; and a plate-shaped elastic member disposed on a rail plate for supporting said pad at one end and pushing said pad through an opening in said rail plate toward said magnetic head, said plate-shaped elastic member being provided such that a longitudinal direction thereof corresponds to a film feed direction and a fixed end thereof is fixed at upstream of a film feed direction when said data are recorded.

12. A camera with a magnetic recording device, comprising:

a cartridge chamber wherein a film cartridge including photographic film wound around a spool is mounted, said photographic film being coated with a magnetic recording layer;

a windup chamber provided with a windup axis for winding up said photographic film pulled out from said film cartridge mounted in said cartridge chamber;

a film path provided with a film exposure opening between said cartridge chamber and said windup chamber, and keeping flat said photographic film pulled out from said film cartridge;

a guide rail provided along said photographic film path for regulating a position of said photographic film transported on said photographic film path;

a film winding device for winding said photographic film by one frame into said windup chamber after photographing;

a magnetic head coming into contact with said magnetic recording layer for recording data while said photographic film is being fed by said film winding device;

a pad arranged to face said magnetic head for bringing said magnetic recording layer on said photographic film in contact with said magnetic head; and a plate-shaped elastic member disposed on a rail plate for supporting said pad at one end and pushing said pad through an opening in said rail plate toward said magnetic head, said plate-shaped elastic member being provided such that a longitudinal direction thereof corresponds to a film feed direction, and a fixed end thereof is fixed at upstream of a film feed direction when said data are recorded.

13. A camera with a magnetic recording device, comprising:

a cartridge chamber wherein a film cartridge including photographic film wound around a spool is mounted, said photographic film being coated with a magnetic recording layer;

a windup chamber provided with a windup axis for winding up said photographic film pulled out from said film cartridge mounted in said cartridge chamber;

a film path provided with a film exposure opening between said cartridge chamber and said windup chamber, and keeping flat said photographic film pulled out from said film cartridge;

a guide rail provided along said photographic film path for regulating a position of said photographic film transported on said photographic film path;

a film supplying device for winding unexposed film around said windup axis from said film cartridge mounted in said cartridge chamber before photographing, and rewinding said photographic film by one frame into said film cartridge of said cartridge chamber after photographing;

a magnetic head coming into contact with said magnetic recording layer for recording data while said photographic film is being fed by said film winding device;

a pad arranged to face said magnetic head for bringing said magnetic recording layer on said photographic film in contact with said magnetic head; and a plate-shaped elastic member for supporting said pad and pushing said pad toward said magnetic head, said plate-shaped elastic member being provided such that a longitudinal direction thereof corresponds to a film feed direction, and a fixed end thereof is fixed at upstream of a film feed direction when said data are recorded.

* * * * *